United States Patent
Hu et al.

(10) Patent No.: US 11,138,422 B2
(45) Date of Patent: Oct. 5, 2021

(54) POSTURE DETECTION METHOD, APPARATUS AND DEVICE, AND STORAGE MEDIUM (71) Applicant: BEIJING DAJIA INTERNET INFORMATION TECHNOLOGY CO., LTD., Beijing (CN)

(72) Inventors: Yukun Hu, Beijing (CN); Yufeng Liu, Beijing (CN); Wen Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/257,261

(22) PCT Filed: Aug. 22, 2019

(86) PCT No.: PCT/CN2019/102088
§ 371 (c)(1),
(2) Date: Dec. 30, 2020

(87) PCT Pub. No.: WO2020/078105
PCT Pub. Date: Apr. 23, 2020

(65) Prior Publication Data
US 2021/0248363 A1    Aug. 12, 2021

(30) Foreign Application Priority Data
Oct. 19, 2018  (CN) .......................... 201811219665.6

(51) Int. Cl.
G06K 9/00    (2006.01)
G06K 9/62    (2006.01)

(52) U.S. Cl.
CPC ..... *G06K 9/00389* (2013.01); *G06K 9/00355* (2013.01); *G06K 9/627* (2013.01); *G06K 9/628* (2013.01); *G06K 9/6256* (2013.01)

(58) Field of Classification Search
CPC ........... G06K 9/00389; G06K 9/00355; G06K 9/6256; G06K 9/627; G06K 9/628
(Continued)

(56) References Cited

U.S. PATENT DOCUMENTS

2009/0087027 A1* 4/2009 Eaton ...................... G06F 15/16
                                                            382/103
2011/0158476 A1  6/2011 Fahn et al.
(Continued)

FOREIGN PATENT DOCUMENTS

CN    104680127 A    6/2015
CN    107451894 A    12/2017
(Continued)

OTHER PUBLICATIONS

International search report of PCT application No. PCT/CN2019/102088 dated Oct. 28, 2019.
(Continued)

*Primary Examiner* — Mark Roz
(74) *Attorney, Agent, or Firm* — Knobbe, Martens, Olson & Bear, LLP (57) ABSTRACT

A method for detecting a posture, including: acquiring an image to be detected; and inputting the image to be detected into a pre-trained detection model, and detecting a posture category in the image to be detected. The detection model is acquired by training based on a positive sample image and a negative sample image, a basic posture categorization model is acquired by training based on the positive sample image with a marked preset posture category, and the negative sample image is determined based on the basic posture categorization model, and the negative sample image contains no posture of the preset posture category and the positive sample image is an image inputted by an user or an image stored at a preset storage location.

16 Claims, 4 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2013/0142417 A1 | 6/2013 | Kutliroff et al. | |
| 2014/0079314 A1* | 3/2014 | Yakubovich | G06K 9/6227 |
| | | | 382/159 |
| 2016/0335503 A1* | 11/2016 | Zhang | G06K 9/00 |

FOREIGN PATENT DOCUMENTS

| | | |
|---|---|---|
| CN | 107729854 A | 2/2018 |
| CN | 108038452 A | 5/2018 |
| CN | 108229277 A | 6/2018 |
| CN | 108229318 A | 6/2018 |
| CN | 108346154 A | 7/2018 |
| CN | 108460341 A | 8/2018 |
| CN | 108491874 A | 9/2018 |
| CN | 109446961 A | 3/2019 |

OTHER PUBLICATIONS

First office action of Chinese application No. 201811219665.6 dated Apr. 1, 2020.
Notification to grant patent right for invention of Chinese application No. 201811219665.6 dated Oct. 9, 2020.
Wei Liu, et al; SSD: Single Shot MultiBox Detector; 2016.
R. Girshick, "Fast R-CNN," in IEEE International Conference on Computer Vision (ICCV), 2015.

* cited by examiner

POSTURE DETECTION METHOD, APPARATUS AND DEVICE, AND STORAGE MEDIUM

CROSS-REFERENCE TO RELATED APPLICATIONS

This application is a US national stage of International Application No. PCT/CN2019/102088, filed on Aug. 22, 2019, which claims priority to Chinese Patent Application No. 201811219665.6, filed with the China National Intellectual Property Administration on Oct. 19, 2018 and titled "POSTURE DETECTION METHOD, APPARATUS AND DEVICE, AND STORAGE MEDIUM", the disclosure of each of which is incorporated herein by reference in its entirety.

TECHNICAL FIELD

The present disclosure relates to the field of image processing technologies and, particularly, relates to a method and apparatus for detecting a posture, and an electronic device and a storage medium thereof.

BACKGROUND

With the continuous development of image acquisition devices, the application of the image acquisition devices is more and more extensive. For example, the image acquisition devices can be used to monitor different scenarios and acquire corresponding images. Moreover, after the images are acquired, useful information can be acquired by analyzing the images.

The inventors have found that under normal circumstances, some specific postures of characters appearing in the images can effectively represent the information such as emotions, moods, altitudes and the like of the characters. For example, the thumb-up gesture, 666 gesture and the like made by the characters can express a positive and happy emotion. Therefore, if the specific postures appearing in the image can be detected, it will play an important role in analyzing the emotions of the characters.

Therefore, how to detect postures in an image has become an urgent problem to be solved.

SUMMARY

In order to overcome the problems in the related art, the present disclosure provides a method and apparatus for detecting a posture, and an electronic device and a storage medium thereof.

According to a first aspect of embodiments of the present disclosure, a method for detecting a posture is provided. The method includes:

acquiring an image to be detected; and inputting the image to be detected into a pre-trained detection model, and detecting a posture category in the image to be detected, wherein the detection model is acquired by training based on a positive sample image and a negative sample image, a basic posture categorization model is acquired by training based on the positive sample image with a marked preset posture category, the negative sample image is determined based on the basic posture categorization model, and the negative sample image contains no posture of the preset posture category and the positive sample image is an image inputted by an user or an image stored at a preset storage location.

According to a second aspect of embodiments of the present disclosure, an apparatus for detecting a posture is provided. The apparatus includes:

a to-be-detected image acquiring unit, configured to acquire an image to be detected; and a detecting unit, configured to input the image to be detected into a pre-trained detection model, and detect a posture category in the image to be detected, wherein the detection model is acquired by training based on a positive sample image and a negative sample image, a basic posture categorization model is acquired by training based on the positive sample image with a marked preset posture category, the negative sample image is determined based on the basic posture categorization model, and the negative sample image contains no posture of the preset posture category and the positive sample image is an image inputted by an user or an image stored at a preset storage location.

According to a third aspect of embodiments of the present disclosure, an electronic device is provided. The electronic device includes:

a processor; and a memory configured to store at least one instruction executable by the processor;

wherein the processor is configured to:

acquire an image to be detected; and input the image to be detected into a pre-trained detection model, and detect a posture category in the image to be detected, wherein the detection model is acquired by training based on a positive sample image and a negative sample image, a basic posture categorization model is acquired by training based on the positive sample image with a marked preset posture category, the negative sample image is determined based on the basic posture categorization model, and the negative sample image contains no posture of the preset posture category and the positive sample image is an image inputted by an user or an image stored at a preset storage location.

According to a fourth aspect of embodiments of the present disclosure, a non-transitory computer-readable storage medium storing at least one instruction therein is provided. The at least one instruction, when executed by the processor of an electronic device, enables the electronic device to perform the method for detecting the posture.

According to a fifth aspect of embodiments of the present disclosure, an application program is provided. The application program, when executed by a processor of an electronic device, enables the electronic device to perform the method for detecting the posture.

According to a sixth aspect of embodiments of the present disclosure, a computer program product is provided. The computer program product, when executed by a processor of an electronic device, enables the electronic device to perform the method for detecting the posture.

The technical solutions according to the embodiments of the present disclosure may achieve the following beneficial effects:

In the embodiments of the present disclosure, the detection model can be acquired by pre-training based on the positive sample image and the negative sample image. When posture detection is performed, the detection of preset postures in the image to be detected can be achieved by the detection model. In addition, when the detection model is trained, the positive sample image and the negative sample image are both used, thereby improving the diversity and abundancy of training data, and further improving the accuracy of the detection model during posture detection. In addition, the negative sample image used in the present disclosure does not require manual marking, which reduces manual workload and improves training efficiency of the model.

It should be understood that the above general description and the following detailed description are only examples and explanatory, and cannot limit the present disclosure.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The technical solutions in the embodiments of the present disclosure will be clearly and completely described below in conjunction with the accompanying drawings in the embodiments of the present disclosure. It is obvious that the described embodiments are only part but not all of the embodiments of the present disclosure. Ail other embodiments derived by those skilled in the art without creative efforts based on the embodiments in the present disclosure are within the protection scope of the present disclosure.

The present disclosure is described in detail below by specific embodiments.

Figure 1:
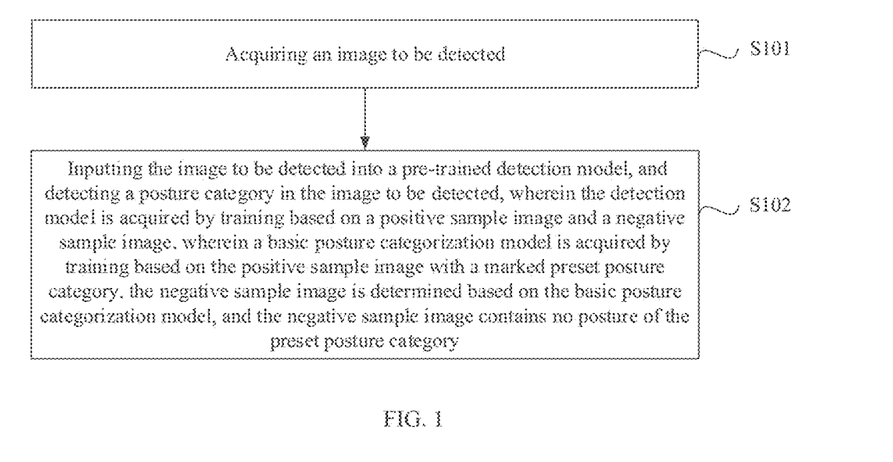
FIG. 1 is a flowchart of a method for detecting a posture according to an embodiment of the present disclosure.

Referring to FIG. 1, FIG. 1 is a flowchart of a method for detecting a posture according to an embodiment of the present disclosure. The method may include the following steps:

In step S101, an image to be detected is acquired.

The method for detecting the posture according to the embodiment of the present disclosure may be applied to any electronic device with an image processing function, such as a desktop computer, a portable computer, a smart mobile terminal and a server, which is not limited in the embodiment of the present disclosure.

The image to be detected is the image to be detected containing the posture category. For example, a user may input the image to be detected into the electronic device, and the electronic device may take the received image as the image to be detected.

In step S102, the image to be detected is input into a pre-trained detection model, and a posture category in the image to be detected is detected, wherein the detection model is acquired, after a basic posture categorization model is acquired by training based on a positive sample image with a marked preset posture category, and a negative sample image is determined based on the basic posture categorization model, by training based on the positive sample image and the negative sample image, and the negative sample image contains no posture of the preset posture category.

In the embodiment of the present disclosure, in order to detect a specific posture in the image, the electronic device may firstly acquire a detection model by training based on a large quantity of sample images, and then detect the image by the detection model to determine the posture category contained therein.

The above detection model may be, for example, a convolutional neural network model. The convolutional neural network is a feedforward neural network. Artificial neurons in the convolutional neural network may respond to part of surrounding units in a coverage area, and has excellent performances for large-scale image processing. The convolutional neural network generally includes a network layer such as a convolutional layer, a pooling layer, a nonlinear layer and a fully connected layer. The detection model in the embodiment of the present disclosure may also be a fully convolutional neural network model, that is, a convolutional neural network that does not include the fully connected layer. The embodiment of the present disclosure does not limit the type and/or structure of the detection model.

Specifically, the electronic device may firstly acquire the basic posture categorization model by training based on the positive sample image, that is, the sample image containing preset category postures. In addition, in order to improve the accuracy of the detection model, the electronic device may also determine a negative sample image, that is, an image that does not include preset category postures. For example, the electronic device may receive an image that does not contain a character input by the user, and then input each negative sample image into the basic posture categorization model, and the basic posture categorization model can output a confidence of the each category posture corresponding to the each negative sample image. The image with a higher confidence is the image that is easy to be misrecognized. Therefore, the electronic device may take the image with a confidence higher than a set threshold (such as 20%, 25%, and 30%) as the negative sample image. After acquiring the positive sample image and the negative sample image, the electronic device may acquire the detection model by training based on the positive sample image and the negative sample image.

During posture detection, the electronic device may input the image to be detected into the detection model, and the detection model may detect the posture category in the image to be detected. For example, the detection model may output the confidence corresponding to each category posture corresponding to the image to be detected. The electronic device may determine the posture category with the confidence higher than the preset confidence as the posture category in the image to be detected.

In the embodiment of the present disclosure, the detection model can be acquired by training in advance according to the positive sample image and the negative sample image. When posture detection is performed, the detection of preset postures in the image to be detected can be achieved by the detection model. In addition, when the detection model is trained, the positive sample image and the negative sample image are both used, thereby improving the diversity and abundancy of training data, and further improving the accuracy of the detection model during posture detection. In addition, the negative sample image used in the present disclosure does not require manual marking, which reduces manual workload and improves training efficiency of the model.

Figure 2:
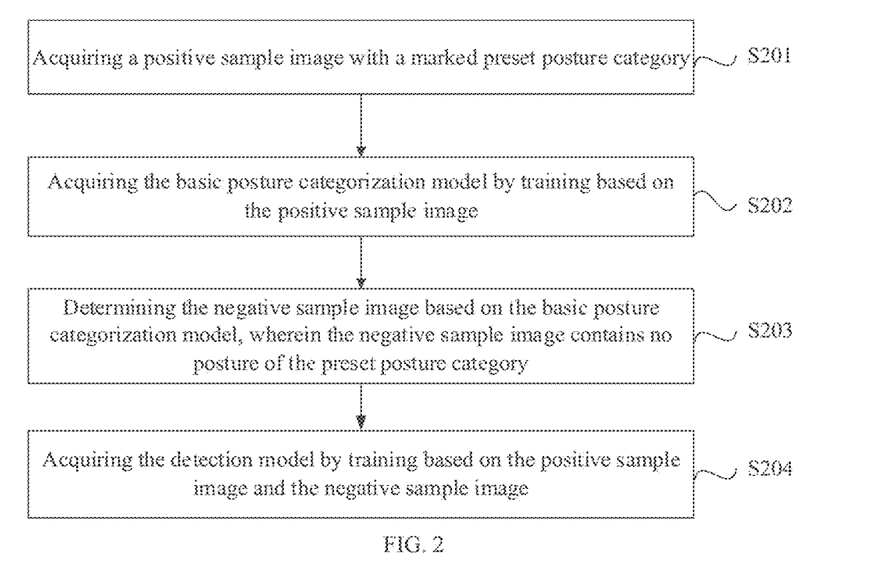
FIG. 2 is a flowchart of a training process of a detection model according to an embodiment of the present disclosure.

As an example of the embodiment of the present disclosure, as shown in FIG. 2, the process of training the detection model by the electronic device may include the following steps:

In step S201, a positive sample image with a marked preset posture category is acquired.

In the embodiment of the present disclosure, the electronic device may acquire the positive sample image, that is, a sample image containing a preset category posture. For example, the electronic device may receive an image input by the user as the positive sample image, or take an image stored at a preset storage location as the positive sample image.

The positive sample image may be manually marked to mark the preset posture category contained in each image, that is, the posture category to be detected when posture detection is performed on the image. The above preset posture category may be set for different application scenarios. For example, for a scenario where the posture category to be detected is a gesture category, the above preset posture category may include: a five gesture, a heart gesture, a great gesture, a 666 gesture, a lift gesture, a victory gesture, a pointer gesture, a hearts gesture, an ok gesture, a fist gesture, or an eight gesture.

The above gesture category may be specifically:
1. five: a five gesture with five open fingers;
2. heart: a one-handed heart gesture;
3. great: a thumb-up gesture;
4. 666: a six gesture;
5. lift: a lift gesture;
6. victory: a scissors gesture;
7. pointer: an index finger pointing gesture;
8. heart2: a gesture with both hands like a heart;
9. ok: an ok gesture;
10. fist: a fist gesture; and
11. eight: an eight gesture.

Figure 3:
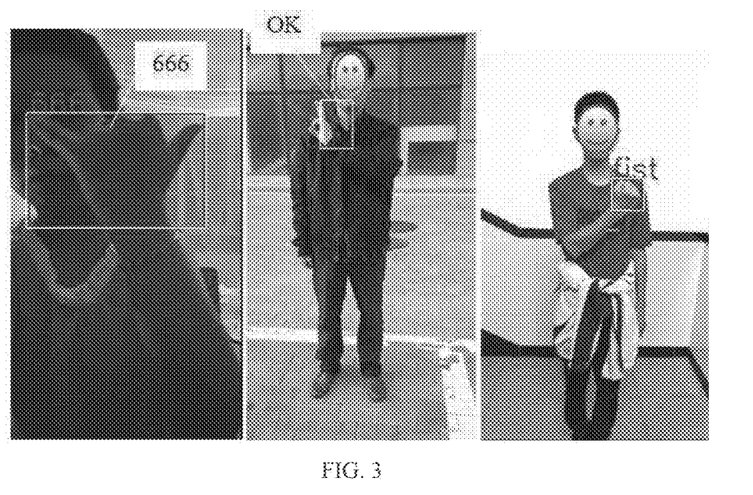
FIG. 3 is a schematic diagram of a gesture category.

For example, as shown in FIG. 3, the drawing respectively shows schematic diagrams of the "666" gesture, the "ok" gesture, and the "fist" gesture.

In step S202, the basic posture categorization model is acquired by training based on the positive sample image.

After the positive sample image is acquired, the electronic device may acquire the basic posture categorization model by training based on the positive sample image. For example, the electronic device may train a preset neural network model by using the positive sample image to acquire the basic posture categorization model that meets a preset condition.

The above preset condition may include, for example, that after the positive sample image is input to the trained neural network model, the posture category recognized by the neural network model is the same as the posture category marked in the corresponding positive sample image.

For a specific training process of the basic posture categorization model, for example, the preset neural network model may be trained by using any known method, which is not limited in the embodiment of the present disclosure. The basic posture categorization model may be trained on an existing deep learning network platform, or may be trained by a built program framework, which is not limited here.

The basic posture categorization model acquired by training, after the image to be detected containing the preset category posture is input, can accurately output a confidence of each category posture contained in the image to be detected, that is, the probability (0-1) of each contained category posture. The greater the probability corresponding to any category posture is, the higher the possibility that the image to be detected contains the category posture is.

In step S203: the negative sample image is determined based on the basic posture categorization model, wherein the negative sample image does not include postures of the preset posture category.

It can be understood that the basic posture categorization model acquired by training the positive sample image has higher accuracy in recognizing the image containing the preset category posture. However, the recognition accuracy for the image that contains no posture of the preset category is poor.

Figure 4:
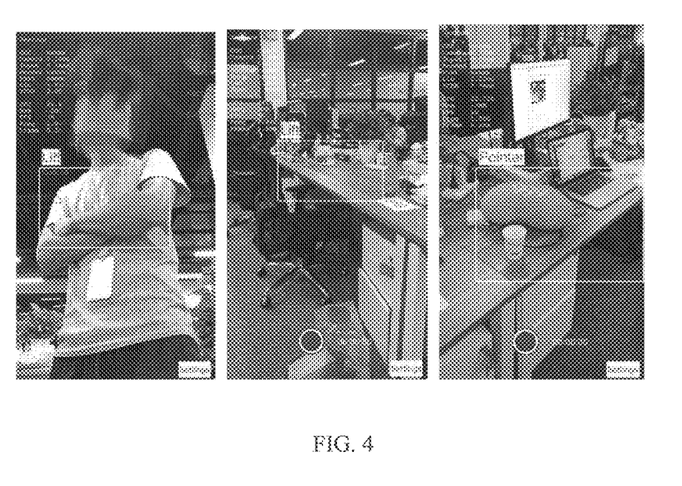
FIG. 4 is a schematic diagram of a misrecognized gesture category.

Referring to FIG. 4, FIG. 4 is a schematic diagram of several misrecognitions. As shown in FIG. 4, the hand-holding gesture may be mistakenly detected as the "hit" gesture, or an object in the image may be mistakenly detected as the "lift" gesture or "pointer" gesture.

In the embodiment of the present disclosure, in order to improve the accuracy of posture detection, the electronic device may acquire the detection model by training based on the positive sample image and the negative sample image. By the detection model, the accurate posture detection may be performed on the image that contains or does not contain the preset category posture.

For example, the electronic device may receive an image that does not contain a character input by the user, and then input each negative sample image into the basic posture categorization model, and the basic posture categorization model may output a confidence of each category posture corresponding to each negative sample image. The image with higher confidence is the image that is easy to be misrecognized. Therefore, the electronic device may take the image with the confidence higher than a set threshold (such as 20%, 25% and 30%) as the negative sample image.

In step S204, the detection model is acquired by training based on the positive sample image and the negative sample image.

After the positive sample image and the negative sample image are acquired, the electronic device may acquire the detection model by training based on the positive sample image and the negative sample image. For example, the electronic device may train a preset neural network model by using the positive sample image and the negative sample image to acquire the detection model that meets a preset condition.

The above preset condition may include, for example, that after the positive sample image is input to the trained neural network model, the posture category recognized by the neural network model is the same as the posture category marked in the corresponding positive sample image. After the negative sample image is input to the trained neural network model, the confidence of the posture category recognized by the neural network model is lower than the set confidence.

For a specific training process of the detection model, the present neural network model may be trained by using any known method, which is not limited in the embodiment of the present disclosure. The detection model may be trained on an existing deep learning network platform, or by a built program framework, which is not limited here.

In the embodiment of the present disclosure, the detection model can be acquired by framing based on the positive sample image and the negative sample image, and the detection of the preset posture in the image can be realized by the detection model. When the detection model is trained, the positive sample image and the negative sample image are both used, thereby improving the diversity and abundance of training data, and further improving the accuracy of the detection model during posture detection. In addition, the negative sample image used in the present disclosure does not require manual marking, which reduces manual workload and improves training efficiency of the model.

It can be understood that when the detection model is trained based on the positive sample image and the negative sample image, the selection of the negative sample image is very important. For example, the quantity and size of negative sample images wall affect the training time of the detection model; and the quality of the negative sample image will affect the accuracy of the detection model.

Figure 5:
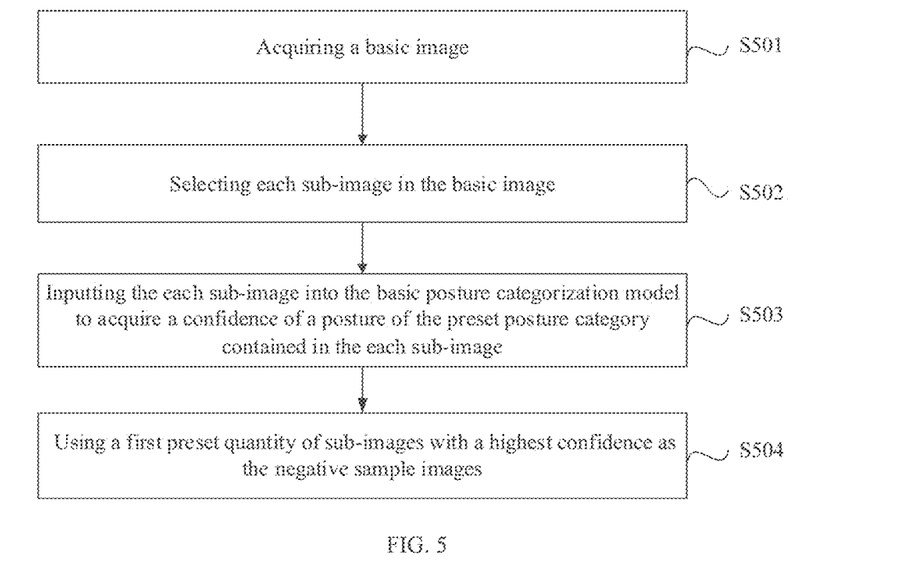
FIG. 5 is another flowchart of a method for detecting a posture according to an embodiment of the present disclosure.

As an example of the embodiment of the present disclosure, as shown in FIG. 5, the process of determining the negative sample image by the electronic device may include the following steps:

In step S501, a basic image is acquired.

In the embodiment of the present disclosure, the electronic device may firstly acquire the basic image and determine the negative sample image based on the basic image. For example, the electronic device may take image input by the user as the basic image.

In step S502, each sub-image is selected in the basic image.

In the embodiment of the present disclosure, in order to improve the training efficiency of the detection model, the electronic device may take the image with a smaller size as the negative sample image. Specifically, the electronic device may select the each sub-image in the basic image, and then determine the negative sample image in the sub-images.

For example, according to a preset size of the sub-image, the electronic device may select a sub-region of such size in the basic image as the each sub-image.

In step S503, the each sub-image is input into the basic posture categorization model, and a confidence of the posture of the preset posture category contained in the each sub-image is acquired.

It can be understood that for the images that do not contain the preset category postures, some images are easily detected as containing the preset category postures, and some images are not easily detected as containing the preset category postures. Moreover, when the detection model is trained by using the images that are easily mis-detected as containing the preset category postures, the detection model will have a higher posture detection accuracy.

In the embodiment of the present disclosure, after acquiring the each sub-image, the electronic device may input the each sub-image into the basic posture categorization model, and then the basic posture categorization model may output the confidence of each category posture corresponding to the each sub-image.

In step S504, a first preset quantity of sub-images with a highest confidence are taken as the negative sample images.

The first preset quantity of sub-images with the highest confidence are taken as the negative sample images, that is, the sub-images that are most likely to be misrecognized are taken as the negative sample images. For example, the electronic device may sort the sub-images in the order of the confidence from high to low, and then select the headmost first preset quantity of sub-images as the negative sample images. The above first preset quantity may be set according to actual conditions, which is not limited in the embodiment of the present disclosure.

In the embodiment of the present disclosure, the negative sample image may be determined by selecting the sub-image in the basic image. In this way, the detection model may be trained by using the negative sample image with a smaller size, thereby improving the training efficiency of the detection model.

As an example of the embodiment of the present disclosure, when the electronic device acquires the basic image, the electronic device may directly take the positive sample image as the basic image. In this way, the detection model may be trained by using a smaller quantity of images, the quantity of used images is reduced, and the user experience is increased.

Correspondingly, when the electronic device uses the positive sample image to train the basic posture categorization model, a marked region where the preset category posture is located may be marked. For example, the marked region may be indicated by a rectangular frame. When the electronic device selects each sub-image in the basic image, any two coordinate points may be determined in the basic image and the sub-region determined by the two coordinate points is determined. When the sub-region determined by the two coordinate points and the marked region in the basic image meet a preset condition, the sub-region is determined as the sub-image.

The above preset condition may include: the intersection over union (IoU) of the sub-region determined by the two coordinate points and the marked region in the basic image being smaller. That is, the value of the area of an intersection region of the sub-region determined by the two coordinate points and the marked region in the basic image divided by the area of a union region of the sub-region determined by the two coordinate points and the marked region in the basic image is less than a preset threshold (such as 0.02, 0.03 and 0.05).

When the IoU between the sub-region and the marked region is smaller, it can be ensured that the sub-region does not contain a complete preset category posture, and the sub-region is determined as the sub-image, thereby improving the quality of the negative sample image, and further improving the accuracy of the detection model.

On the basis of the above embodiment, as an example of the embodiment of the present disclosure, in order to further improve the accuracy of the detection model, the electronic device may update the detection model acquired by training. The detection model may be trained by using a larger quantity of n. For example, a ratio of the quantity of negative sample images selected by the electronic device to the quantity of positive sample images may be greater than a preset ratio threshold (such as 3, 5 and 8).

Specifically, the electronic device may select each target sub-image in the basic image, and the quantity of the target sub-images is greater than the quantity of the sub-images. Each target sub-image is input into the detection model to acquire a confidence of a posture of a preset posture category contained in each target sub-image. A second preset quantity of target sub-images with the highest confidence are taken as the target negative sample images, and the second preset quantity is greater than the first preset quantity. In the target negative sample images, the target negative sample images with the same quantity as the positive sample images are sequentially selected, and iterative training is performed according to the selected target negative sample images and the positive sample images to acquire an updated detection model.

The sampling method in the embodiment of the present disclosure can increase the complexity and diversity of the negative sample images while ensuring the balance of the quantity of various sample images. The complexity is manifested in that all negative sample images are the most likely mis-detected images, and the diversity is manifested in that the negative sample images used in each iteration of the detection model are different and have great changes. In this ways the accuracy of the detection model can be improved.

As an example of the embodiment of the present disclosure, after the detection model is acquired, the electronic device may also recognize a false detection rate of the detection model. When the false detection rate is greater than a preset probability threshold, the step of selecting each target sub-image in the basic image is repeated, that is, the detection model is updated again until the false detection rate is not greater than the preset probability threshold. By continuously updating the detection model, the lower false detection rate of the detection model can be ensured.

The training process of the above detection model will be described in detail below in conjunction with a specific embodiment.

1. Firstly, based on a large amount of manually marked gesture data, that is, the positive sample image (including 11 gestures, the same as the gesture category described in step S101), a basic categorizer is trained by a traditional gesture categorization model. The categorizer can receive picture input and output a categorization probability (0 to 1) of the gesture in a picture belonging to each of the above gestures. The basic model has a higher accuracy for normal gesture recognition, but a poor categorization effect for other inputs (for example, no gestures appear).

2. Based on the basic model containing 11 gestures, a new background category, that is, the negative sample image, is added, and all categories that do not belong to the 11 basic gestures are categorized as a background category. Training data of the background category is acquired by a dynamic sampling method. The specific method is as follows:

1. Random sampling is performed according to original manually marked data, that is, two coordinates (x0, y0) and (x1, y1) are randomly generated in the original picture, and the two coordinates can uniquely determine a sub-picture.

2. The IoU of all the marked regions in the acquired sub-picture and the original picture is calculated. If the IoU is less than 0.05, the sampling is considered as effective sampling and the next step is performed, otherwise step 1 is performed.

3. The acquired coordinates are taken as the marking data, and are stored in the marking data as the background category.

1 million background category negative samples acquired by random sampling axe sampled by using the method. Most samples achieve no beneficial effect on the model, such that the acquired 1 million negative samples are categorized by using the basic categorization model and sorted in a descending order according to the acquired confidence probability. The top 20,000 data, i.e., 20,000 negative samples most likely to be miscategorized, are selected. An advanced categorizer containing eleven gestures plus the background category is trained by using the acquired 20,000 negative samples and all the gesture data. The advanced categorizer greatly improves the categorization accuracy for the gestures, but the problem is that the background data is too single. Although most pictures without gestures can be correctly categorized as the background, the categorization results are poor for a few special cases.

3. The original data is sampled by using the dynamic sampling method in step 2. At this time, the sampling quantity is 5 million. The 5 million negative samples are categorized and sorted in an ascending order of the confidence probability of the background category by using the advanced categorizes. The top 200,000 negative samples are selected, and then all the negative sample data, that are most likely to be miscategorized are acquired. The quantity of 200,000 negative samples collected dynamically is much larger than the quantity of gesture samples of various categories. Therefore, when the final model is trained, during each iteration, the negative samples with the same quantity as the gestures of various categories are randomly selected from all negative samples for training to acquire the final categorization model.

Such a sampling method may increase the complexity and diversity of background category negative samples while ensuring the balance of various types of training data. The complexity is manifested, in that all training data are the most easily miscategorized data, and the diversity is manifested in that the training data used in each iteration of the model is different and has great changes. After testing, the categorization accuracy and stability of the model acquired by the method are greatly improved, and the whole process is unsupervised, without any manual marking.

If the effect of the model is poor, step 3 may be repeated iteratively until the categorization accuracy and stability of the model reach the expected effect.

Figure 6:
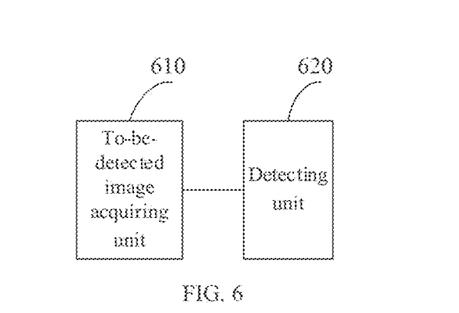
FIG. 6 is a schematic structural diagram of an apparatus for detecting a posture according to an embodiment of the present disclosure.

Correspondingly, an embodiment of the present disclosure also provides an apparatus for posture detection. FIG. 6 is a block diagram of an apparatus for detecting a posture according to an embodiment. Referring to FIG. 6, the apparatus includes: a to-be-detected image acquiring unit 610 and a detecting unit 620.

The to-be-detected image acquiring unit 610 is configured to acquire an image to be detected.

The detecting unit 620 is configured to input the image to be detected into a pre-trained detection model, and detect a posture category in the image to be detected, wherein the detection model is acquired by training based on a positive sample image and a negative sample image, wherein a basic posture categorization model is acquired by training based on the positive sample image with a marked preset posture category, the negative sample image is determined based on the basic posture categorization model, and the negative sample image contains no posture of the preset posture category.

In the embodiment of the present disclosure, the detection model may be acquired by training in advance based on the positive sample image and the negative sample image. When posture detection is performed, the detection of preset postures in the image to be detected can be achieved by the detection model. In addition, when the detection model is trained, the positive sample image and the negative sample image are both used, thereby improving the diversity and abundancy of training data, and further improving the accuracy of the detection model during posture detection. In addition, the negative sample image used in the present disclosure does not require manual marking, which reduces manual workload and improves training efficiency of the model.

Figure 7:
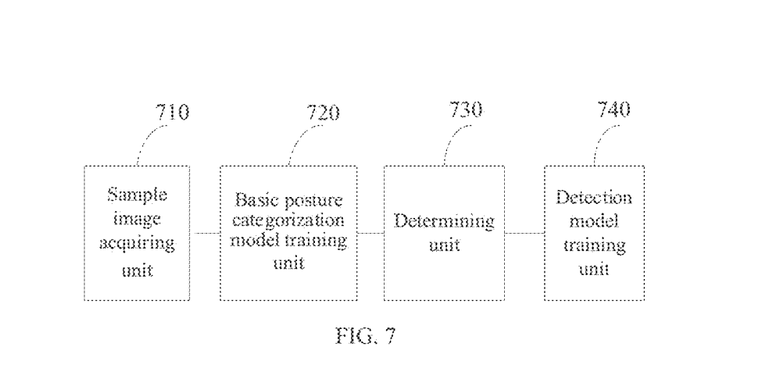
FIG. 7 is another schematic structural diagram of an apparatus for detecting a posture according to an embodiment of the present disclosure.

Optionally, as shown in FIG. 7, the above apparatus for detecting the posture further includes: a sample image acquiring unit 710, a basic posture categorization model training unit 720, a determining unit 730, and a detection model training unit 740.

The sample image acquiring unit 710 is configured to acquire the positive sample image with a marked preset posture category.

The basic posture categorization model training unit 720 is configured to acquire the basic posture categorization model by training based on the positive sample image.

The determining unit 730 is configured to determine the negative sample image based on the basic posture categorization model, wherein the negative sample image contains no posture of the preset posture category.

The detection model training unit 740 is configured to acquire the detection model by training based on the positive sample image and the negative sample image.

Optionally, the determining unit 730 includes:
an acquiring subunit, configured to acquire a basic image;
a selecting subunit, configured to select each sub-image in the basic image;
an executing subunit, configured to input the each sub-image into the basic posture categorization model to acquire a confidence of a posture of the preset posture category contained in the each sub-image; and
a determining subunit, configured to take a first preset quantity of sub-images with a highest confidence as the negative sample images.

Optionally, the acquiring subunit is specifically configured to take the positive sample image as the basic image.

Optionally, the positive sample image includes a marked region where the posture of the preset posture category is located, and the selecting submit is specifically configured to:
determine any two coordinate points in the basic image, and determine a sub-region determined by the two coordinate points; and
determine the sub-region as a sub-image if the sub-region determined by the two coordinate points and the marked region in the basic image meet a preset condition.

Optionally, the preset condition includes: a value of the area of an intersection region of the sub-region determined by the two coordinate points and the marked region in the basic image divided by the area of a union region of the sub-region determined by the two coordinate points and the masked region in the basic image being less than a preset threshold.

Optionally, the apparatus also includes:
a selecting unit, configured to select each target sub-image in the basic image, the quantity of the target sub-images being greater than the quantity of the sub-images;
an inputting unit, configured to input the each target sub-image into the detection model to acquire a confidence of the posture of the preset posture category contained in the each target sub-image;
an executing unit, configured to take a second preset quantity of target sub-images with the highest confidence as target negative sample images, the second preset quantity being greater than the first preset quantity; and
an updating unit, configured to, in the target negative sample images, sequentially select the target negative sample images with the same quantity as the positive sample images, and perform iterative training according to the selected target negative sample images and the positive sample images to acquire an updated detection model.

Optionally, the apparatus further includes:
a recognizing unit, configured to recognize a false detection rate of the detection model; and a processing unit, configured to, if the false detection rate is greater than a preset probability threshold, trigger the selecting unit until the false detection rate is not greater than the preset probability threshold.

Optionally, the preset posture category includes, a five gesture, a heart gesture, a great gesture, a 666 gesture, a lift gesture, a victory gesture, a pointer gesture, a heart2 gesture, an ok gesture, a fist gesture, or an eight gesture.

Optionally, the detecting unit 620 includes:
an executing subunit, configured to input the image to be detected into the pre-trained detection model to acquire a confidence corresponding to each category posture output by the detection model; and
a determining subunit, configured to determine the posture category with the confidence higher than a preset confidence as the posture category in the image to be detected.

Regarding the apparatus in the above embodiment, the way in which each module performs operations has been described in detail in the embodiment of the method, and detailed description will not be given here.

Correspondingly, an embodiment of the present disclosure further provides an electronic device. The electronic device includes
a processor; and
a memory configured to store at least one instruction executable by the processor;
wherein the processor is configured to:
acquire an image to be detected; and
input the image to be detected into a pre-trained detection model, and detect a posture category in the image to be detected, wherein the detection model is acquired by training based on a positive sample image and a negative sample image, wherein a basic posture categorization model is acquired by training based on the positive sample image with a marked preset posture category, the negative sample image is determined based on the basic posture categorization model, and the negative sample image contains no posture of the preset posture category.

Optionally, the processor is further configured to:
acquire the positive sample image with a marked preset posture category;
acquire the basic posture categorization model by training based on the positive sample image;
determine the negative sample image based on the basic posture categorization model wherein the negative sample image contains no posture of the preset posture category; and
acquire the detection model by training based on the positive sample image and the negative sample image.

Optionally, the processor is specifically configured to:
acquire a basic image;
select each sub-image in the basic image;
input the each sub-image into the basic posture categorization model to acquire a confidence of a posture of the preset posture category contained in the each sub-image; and
take a preset quantity of sub-images with a highest confidence as the negative sample images.

Optionally, the processor is specifically configured to take the positive sample image as the basic image.

Optionally, the positive sample image includes a marked region where the posture of the preset posture category is located, and the processor is specifically configured to:
determine any two coordinate points in the basic image, and determine a sub-region determined by the two coordinate points, and determine the sub-region as a sub-image if the sub-region determined by the two coordinate points and the marked region in the basic image meet a preset condition.

Optionally, the preset condition includes: a value of the area of an intersection region of the sub-region determined by the two coordinate points and the marked region in the basic image divided by the area of a union region of the sub-region determined by the two coordinate points and the marked region in the basic image being less than a preset threshold.

Optionally, the processor is further configured to:

select each target sub-image in the basic image after the detection model is acquired by training based on the positive sample image and the negative sample image, the quantity of the target sub-images being greater than the quantity of the sub-images;

input the each target sub-image into the detection model to acquire a confidence of the posture of the preset posture category contained in the each target sub-image;

take a second preset quantity of target sub-images with the highest confidence as target negative sample images, the second preset quantity being greater than the first preset quantity; and in the target negative sample images, sequentially select the target negative sample images with the same quantity as the positive sample images, and perform iterative training according to the selected target negative sample images and the positive sample images to acquire an updated detection model.

Optionally, the processor is further configured to:

recognize a false detection rate of the detection model after acquiring the updated detection model; and if the false detection rate is greater than a preset probability threshold, repeat the step of selecting the each target sub-image in the basic image until the false detection rate is not greater than the preset probability threshold.

Optionally, the preset posture category includes: a five gesture, a heart gesture, a great gesture, a 666 gesture, a lift gesture, a victory gesture, a pointer gesture, a heart2 gesture, an ok gesture, a list gesture, or an eight gesture.

Optionally, the processor is specifically configured to:

input the image to be detected into the pre-trained detection model to acquire a confidence corresponding to each category posture output by the detection model, and determine the posture category with the confidence higher than a preset confidence as the posture category in the image to be detected.

Figure 8:
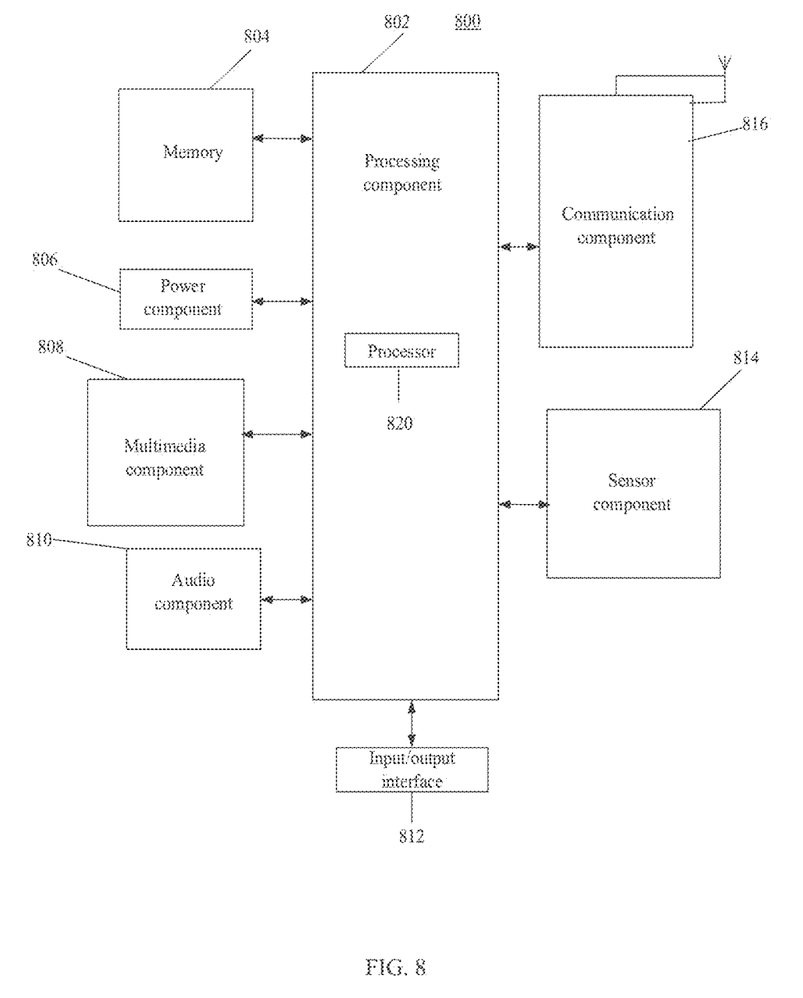
FIG. 8 is a schematic structural diagram of an electronic device according to an embodiment of the present disclosure.

FIG. 8 is a schematic structural diagram of an electronic device according to an embodiment of the present disclosure. For example, the electronic device 800 can be a mobile phone, a computer, a digital broadcasting terminal, a messaging device, a game console, a tablet device, a medical device, a fitness device, a personal digital assistant, etc.

Referring to FIG. 8, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processor's 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented using any type of volatile or non-volatile memory devices, or a combination thereof such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a from camera and/or a rear camera. The front camera and the rear camera may receive an external multimedia datum while the device 800 is in an operation mode, such as a photographing mode or a video mode. Each of the front camera, and the rear camera, may be a fixed optical lens system or have focus and optical zoom capability.

The audio component 810 is configured to output and/or input audio signals. For example, the audio component 810 includes a microphone ("MIC") configured to receive an external audio signal when the electronic device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the electronic device 800, relative positioning of components, e.g., the display and the keypad, of the electronic device 800, a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a complementary metal oxide semiconductor (CMOS) or charge-coupled device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 can access a wireless network based on a communication standard, such as Wi-Fi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency recognition (RFID) technology, an infrared data association (IrDA) technology, an ultra-wideband (UWB) technology, a Bluetooth (BT) technology, and other technologies.

In embodiments, the electronic device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components to realize the above methods.

In embodiments, there is also provided a non-transitory computer readable storage medium including instructions, such as the memory 804 including instructions. These instructions may be loaded and executed by the processor 820 in the electronic device 800 for controlling a millimeter wave antenna. For example, the non-transitory computer-readable storage medium may be a ROM, a RAM, a CD-ROM, a magnetic tape, a floppy disc, an optical data storage device, or the like.

In embodiments, there is also provided an application, which, when being executed by a processor of an electronic device, causes the electronic device to implement the above gesture detection methods to acquire the same technical effect.

In embodiments, there is also provided a computer program product, which, when being executed by a processor of an electronic device, causes the electronic device to implement the above gesture detection methods to acquire the same technical effect.

It should be noted that, as used herein, relation terms such as "first" and "second" are used merely to distinguish a subject or an operation from another subject or another operation, and not to imply any substantial relation or order between these subjects or operations. Moreover, the term "include", "comprise" or any other variants thereof is intended to cover non-exclusive including, such that the process, method, article, or device including a plurality of elements includes not only those elements but also other elements that are not explicitly listed, or also includes the elements that are inherent to such a process, method, item, or device. Without more limitations, the element defined by the phrase "including a . . . " does not exclude the presence of additional equivalent elements in the process, method, item, or device that includes the element.

The various embodiments in the specification are described in a progressive way, the same or similar parts between the various embodiments may be referred to each other, and each embodiment focuses on the differences from the other embodiments. In particular, for the apparatus embodiment, since it is basically similar to the method embodiment, the description is relatively simple, and the relevant parts may be referred to the description of the method embodiment.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for detecting a posture, comprising:
   acquiring an image to be detected; and
   inputting the image to be detected into a pre-trained detection model, and detecting a posture category in the image to be detected,
   wherein the detection model is acquired by training based on a positive sample image and a negative sample image, a basic posture categorization model is acquired by training based on the positive sample image with a marked preset posture category, and the negative sample image is determined based on the basic posture categorization model,
   wherein the negative sample image contains no posture of the preset posture category and the positive sample image is an image inputted by a user or an image stored at a preset storage location,
   wherein training of the detection model comprises:
      acquiring the positive sample image with a marked preset posture category;
      acquiring the basic posture categorization model by training based on the positive sample image;
      determining the negative sample image based on the basic posture categorization model; and
      acquiring the detection model by training based on the positive sample image and the negative sample image, and
   wherein determining the negative sample image based on the basic posture categorization model comprises:
      acquiring a basic image;
      selecting each sub-image in the basic image;
      inputting the each sub-image into the basic posture categorization model to acquire a confidence of a posture of the preset posture category contained in the each sub-image; and
      taking a first preset quantity of sub-images with a highest confidence as the negative sample images.

2. The method according to claim 1, wherein acquiring the basic image comprises:
taking the positive sample image as the basic image.

3. The method according to claim 2, wherein the positive sample image comprises a marked region where the posture of the preset posture category is located, and selecting the each sub-image in the basic image comprises:
determining any two coordinate points in the basic image, and determining a sub-region determined by the two coordinate points; and
determining the sub-region as a sub-image if the sub-region determined by the two coordinate points and the marked region in the basic image meet a preset condition.

4. The method according to claim 3, wherein the preset condition comprises: a value of the area of an intersection region of the sub-region determined by the two coordinate points and the marked region in the basic image divided by the area of a union region of the sub-region determined by the two coordinate points and the marked region in the basic image being less than a preset threshold.

5. The method according to claim 1, wherein after acquiring the detection model by training based on the positive sample image and the negative sample image, the method further comprises:
selecting each target sub-image in the basic image, the quantity of target sub-images being greater than the quantity of sub-images;
inputting the each target sub-image into the detection model to acquire a confidence of the posture of the preset posture category contained in the each target sub-image;
taking a second preset quantity of target sub-images with the highest confidence as target negative sample images, the second preset quantity being greater than the first preset quantity; and
in the target negative sample images, sequentially selecting the target negative sample images with the same quantity as the positive sample images, and performing iterative training according to the selected target negative sample images and the positive sample images to acquire an updated detection model.

6. The method according to claim 5, wherein after acquiring the detection model, the method further comprises:
recognizing a false detection rate of the detection model; and
if the false detection rate is greater than a preset probability threshold, repeating the step of selecting the each target sub-image in the basic image until the false detection rate is not greater than the preset probability threshold.

7. The method according to claim 1, wherein inputting the image to be detected into the pre-trained detection model, and detecting the posture category in the image to be detected comprise:
inputting the image to be detected into the pre-trained detection model to acquire a confidence corresponding to each category posture output by the detection model; and
determining the posture category with the confidence higher than a preset confidence as the posture category in the image to be detected.

8. An apparatus for detecting a posture, comprising:
a to-be-detected image acquiring unit, configured to acquire an image to be detected;
a detecting unit, configured to input the image to be detected into a pre-trained detection model, and detect a posture category in the image to be detected,
wherein the detection model is acquired by training based on a positive sample image and a negative sample image, a basic posture categorization model is acquired by training based on the positive sample image with a marked preset posture category, and the negative sample image is determined based on the basic posture categorization model, and
wherein the negative sample image contains no posture of the preset posture category and the positive sample image is an image inputted by a user or an image stored at a preset storage location;
a sample image acquiring unit configured to acquire the positive sample image with a marked preset posture category;
a basic posture categorization model training unit, configured to acquire the basic posture categorization model by training based on the positive sample image;
a determining unit configured to determine the negative sample image based on the basic posture categorization model, the determining unit comprising:
an acquiring subunit configured to acquire a basic image;
a selecting subunit configured to select each sub-image in the basic image;
an executing subunit configured to input the each sub-image into the basic posture categorization model to acquire a confidence of a posture of the preset posture category contained in the each sub-image; and
a determining subunit, configured to take a first preset quantity of sub-images with a highest confidence as the negative sample images; and
a detection model training unit configured to acquire the detection model by training based on the positive sample image and the negative sample image.

9. The apparatus according to claim 8, wherein the acquiring subunit is configured to take the positive sample image as a basic image.

10. The apparatus according to claim 9, wherein the positive sample image comprises a marked region where the posture of the preset posture category is located, and the selecting subunit is configured to:
determine any two coordinate points in the basic image, and determine a sub-region determined by the two coordinate points; and
determine the sub-region as a sub-image if the sub-region determined by the two coordinate points and the marked region in the basic image meet a preset condition.

11. The apparatus according to claim 10, wherein the preset condition comprises: a value of the area of an intersection region of the sub-region determined by the two coordinate points and the marked region in the basic image divided by the area of a union region of the sub-region determined by the two coordinate points and the marked region in the basic image being less than a preset threshold.

12. The apparatus according to claim 9, further comprising:
a selecting unit, configured to select each target sub-image in the basic image, a quantity of target sub-images being greater than a quantity of sub-images;
an inputting unit, configured to input the each target sub-image into the detection model to acquire a confidence of the posture of the preset posture category contained in the each target sub-image;

an executing unit, configured to take a second preset quantity of target sub-images with the highest confidence as target negative sample images, the second preset quantity being greater than the first preset quantity; and an updating unit, configured to, in the target negative sample images, sequentially select the target negative sample images with the same quantity as the positive sample images, and perform iterative training according to the selected target negative sample images and the positive sample images to acquire an updated detection model.

13. The apparatus according to claim 12, further comprising:

a recognizing unit, configured to recognize a false detection rate of the detection model; and a processing unit, configured to, if the false detection rate is greater than a preset probability threshold, trigger the selecting unit until the false detection rate is not greater than the preset probability threshold.

14. The apparatus according to claim 8, wherein the detecting unit comprises:

an executing subunit, configured to input the image to be detected into the pre-trained detection model to acquire a confidence corresponding to each category posture output by the detection model; and a determining subunit, configured to determine the posture category with the confidence higher than a preset confidence as the posture category in the image to be detected.

15. An electronic device, comprising:

a processor; and a memory configured to store at least one instruction executable by the processor;

wherein the processor is configured to:

acquire an image to be detected; and input the image to be detected into a pre-trained detection model, and detect a posture category in the image to be detected, wherein the detection model is acquired by training based on a positive sample image and a negative sample image, wherein a basic posture categorization model is acquired by training based on the positive sample image with a marked preset posture category, the negative sample image is determined based on the basic posture categorization model, and the negative sample image contains no posture of the preset posture category, wherein training of the detection model comprises:

acquiring the positive sample image with a marked preset posture category;

acquiring the basic posture categorization model by training based on the positive sample image;

determining the negative sample image based on the basic posture categorization model; and acquiring the detection model by training based on the positive sample image and the negative sample image, and wherein determining the negative sample image based on the basic posture categorization model comprises:

acquiring a basic image;

selecting each sub-image in the basic image;

inputting the each sub-image into the basic posture categorization model to acquire a confidence of a posture of the preset posture category contained in the each sub-image; and taking a first preset quantity of sub-images with a highest confidence as the negative sample images.

16. A non-transitory computer-readable storage medium storing at least one instruction therein, wherein the at least one instruction, when executed by a processor of an electronic device, enables the electronic device to perform the method for detecting the posture according to claim 1.

* * * * *